(12) United States Patent
Stepanek

(10) Patent No.: US 6,835,265 B1
(45) Date of Patent: Dec. 28, 2004

(54) PROCESS FOR PERFORATING HIGHLY EMBOSSED ROLLS OF DUAL LAYERED WRAPPING ELEMENTS TO FORM SHEETS THEREOF

(75) Inventor: Peter Bruce Stepanek, Amherst, NH (US)

(73) Assignee: Hampshire Paper Corp., Milford, NH (US)

( * ) Notice: Subject to any disclaimer, the term of this patent is extended or adjusted under 35 U.S.C. 154(b) by 0 days.

(21) Appl. No.: 10/392,246

(22) Filed: Mar. 20, 2003

Related U.S. Application Data

(63) Continuation-in-part of application No. 10/364,958, filed on Feb. 13, 2003, and a continuation-in-part of application No. 08/879,700, filed on Jun. 18, 1997, now Pat. No. 5,922,455.

(51) Int. Cl.$^7$ ............................................. B32B 31/00
(52) U.S. Cl. ..................... 156/209; 156/220; 156/252; 156/308.2
(58) Field of Search ................................. 156/209, 219, 156/220, 252, 308.2

(56) References Cited

U.S. PATENT DOCUMENTS

| 4,394,410 A | * | 7/1983 | Osrow et al. .................. 428/43 |
| 4,980,212 A | * | 12/1990 | Marquis et al. ............. 428/40.1 |
| 5,922,455 A | * | 7/1999 | Stepanek ..................... 428/332 |
| 2002/0088738 A1 | * | 7/2002 | Malone et al. .............. 206/554 |

* cited by examiner

*Primary Examiner*—Linda L Gray
(74) *Attorney, Agent, or Firm*—Stephanor Consult. Ser., Inc.; Stephen W. White

(57) ABSTRACT

A method for preparing sheets of material from a roll of a dual layered, highly embossed element useful in wrapping floral elements such as flower pots and the like. This material comprises a plastic or sealing layer laminated to an aluminum forming layer. The plastic layer may be embossed prior to lamination or after lamination and may also be colored. The roll of highly embossed material is perforated using small slits across the width thereof at predetermined points along the width. The user separates sheets of material as needed by pulling down and tearing the material along these perforated points.

6 Claims, 4 Drawing Sheets

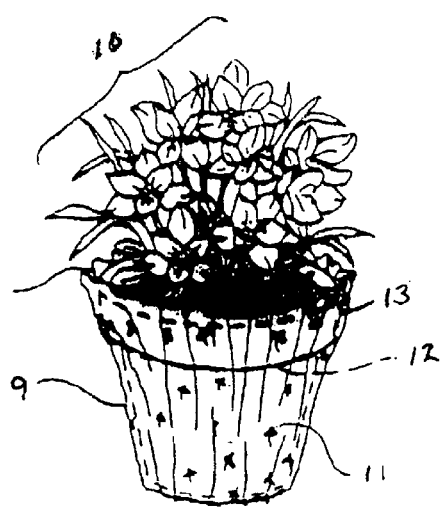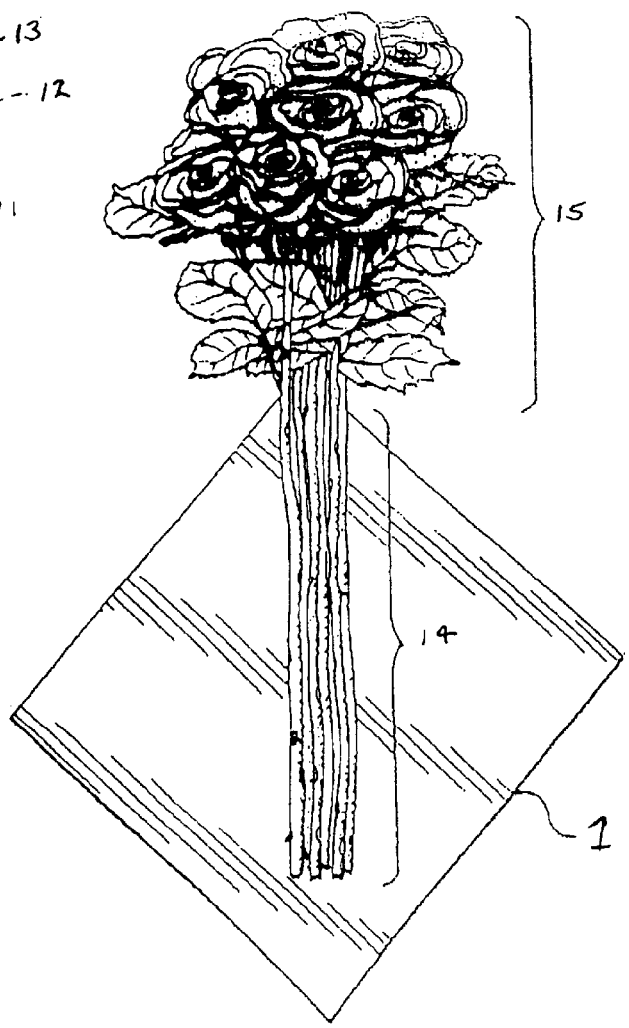

PROCESS FOR PERFORATING HIGHLY EMBOSSED ROLLS OF DUAL LAYERED WRAPPING ELEMENTS TO FORM SHEETS THEREOF

CROSS REFERENCE TO PRIOR PATENTS

This application is a Continuation-in-Part of my previous invention entitled "Holographically Enhanced Wrapping Elements", application Ser. No. 08/879,700, now U.S. Pat. No. 5,922,455, and dated Jun. 18, 1997 and is also a continuation of my earlier filed patent application entitled "Process for Perforating Rolls of Dual Layer and Embossed Floral Wrapping Elements to Form Sheets Thereof", application Ser. No. 10,364,958 filed Feb. 13, 2003.

BACKGROUND OF THE INVENTION

1. Field of the Invention

This invention relates to sheet elements useful in the wrapping of floral arrangements and products related thereto. More specifically, this invention relates to sheet elements useful in wrapping pots that contain floral elements and the like. Still more specifically, this invention relates to sheets that can be easily separated from rolls of dual layered highly embossed wrapping elements to be used in the aforementioned wrapping processes.

2. Description of the Prior Art

In my previous invention U.S. Pat. No. 5,922,455 referred to above, from which this application depends, I describe a holographically enhanced (lightly embossed) wrapping element comprising dual layers, one layer comprising a plastic sealing layer (holographically enhanced and lightly embossed) laminated to a second layer comprising a forming element (aluminum foil). This patent describes the unique method of laminating these dual layers after holographically enhancing (embossing) the film element. The very step of holographically enhancing the film layer by lightly embossing the layer to the varied depth and angles required to achieve a holographic image, appears to impart minute changes to the character of the film and thus appears to increase the cross directional strength of the dual layered element made therefrom. This element is eminently useful for the wrapping of floral elements such as arrangements, pots, etc. The problems with such a dual-layered, holographically enhanced (lightly embossed) element is that it is extremely tough and durable and hence difficult to cut or separate into sheets. In order to accomplish this separation of sheets from a roll manufactured by the process of this invention it is normally done by cutting with a sharp knife or scissors. This step is time consuming and difficult for the field to perform when making up wrappings for floral elements or flower pots and the like. It is opined that the strength of this dual layered element results from this embossing step thus making the product difficult to tear and even cut. All of the processes and methods for manufacturing these dual layered holographically imaged materials useful within the ambit of this invention are fully described in my aforementioned U.S. Pat. No. 5,922,455 and are thus incorporated within the ambit of this invention.

In my co-filed patent application entitled "Process for Perforating Rolls of Dual Layer and Embossed Floral Wrapping Elements to Form Sheets Thereof", filed Feb. 13, 2003, from which the present application is a Continuation, I describe how one can perforate such holographically and lightly embossed elements in order to separate sheets from rolls of this material. In this reference I describe the discovery of a process to perforate dual layered elements that have increased tensile strength as a result of impressing a holographic image thereon.

There are numerous other products made into sheet form in order to provide the floral and wrapping industry with individual sheets. However, these prior art wrapping elements are single layered elements and not made in the format described in my previous patent or embossed as described in either reference.

There is a pressing need to have a dual layered, highly embossed and decorative product useful for wrapping floral elements including flower pots and the like and yet have such a product that can be easily separated into sheets from rolls in which this product is manufactured.

SUMMARY OF THE INVENTION

It is an object of this invention to provide a roll of dual layered, highly embossed material for wrapping floral arrangements and other elements useful in that art field and one that can provide easily separated sheets of material taken therefrom. It is yet another object to provide a roll of such material that is perforated along a line described by the requisite needs of length and width needed by the floral industry. These and yet other objects are achieved in a process for the manufacture of sheets of a dual layered element from a roll, said roll comprising a length described by a starting end and a finishing end, and two sides, said sides describing a width thereof, said process comprising a the steps of:

a. laminating a plastic sealing layer of highly embossed material to a forming layer;

b. inscribing a multitude of rows of perforations across the width of said roll at predetermined points along the length thereof; so that when force is applied at said perforations sheets of said dual layered element will be separated from said roll.

In yet another embodiment, this invention describes a process for the manufacture of sheets of a dual layered element from a roll, said roll comprising a length described by a starting end and a finishing end, and two sides, said sides describing a width thereof, said process comprising the steps of:

a. laminating a plastic sealing layer to a forming layer;

b. imparting a highly embossed image on said plastic sealing layer;

c. inscribing a multitude of rows of perforated slits across the width of said roll at predetermined points along the length thereof; so that when force is applied at said perforations, sheets of said dual layered element will be separated from said roll.

BRIEF DESCRIPTION OF THE DRAWINGS

FIGS. 5–8 show the highly embossed dual layered wrapping material being used within the floral industry in a number of different ways.

DETAILS OF THE INVENTION

Figure 1:
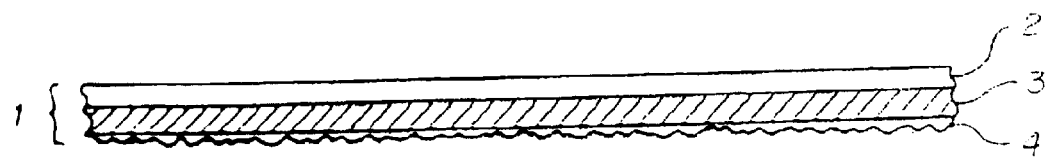
FIG. 1 is a side view of a sheet of highly embossed, dual layered wrapping material of this invention.

Looking now specifically at the drawings. accompanying this invention and which show some of the preferred features of my invention, FIG. 1 is a side view of a sheet of wrapping element showing the various layers thereon. In this particular figure, 1 is the sheet of the wrapping element which is a combination of two layers (dual layered) heat laminated together by gluing wherein 2 is a forming layer and 3 is a sealing layer which has previously been highly embossed. Alternatively, the sealing layer may be embossed after laminating the two elements together. The high embossment is graphically shown as a series of irregularities 4 in the surface of sealing layer 3. Increasing the depth of the embossment from 0.25 microns to as deep as 5.0 microns alters the refractivity of the primary colors of the light spectrum. The individual colors being red, yellow, green and blue are thus not as pronounced giving a more 2-dimensional appearance to this surface.

Figure 2:
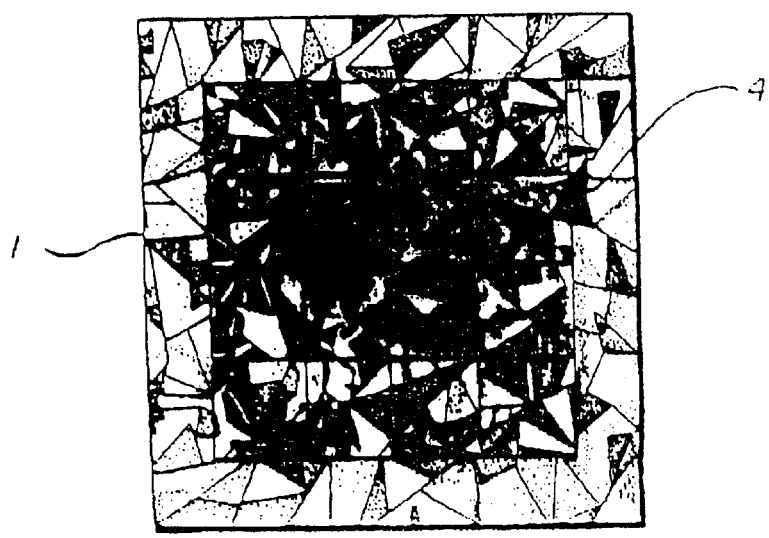
FIG. 2 is a top view of a sheet of highly embossed dual layered wrapping material of this invention.

FIG. 2 is a showing of the sheet from FIG. 1 noted as 1. In this showing, the forming layer 2 (which is not clearly seen) is being viewed through the sealing layer 3 containing a highly embossed layer 4 thereon.

Figure 3:
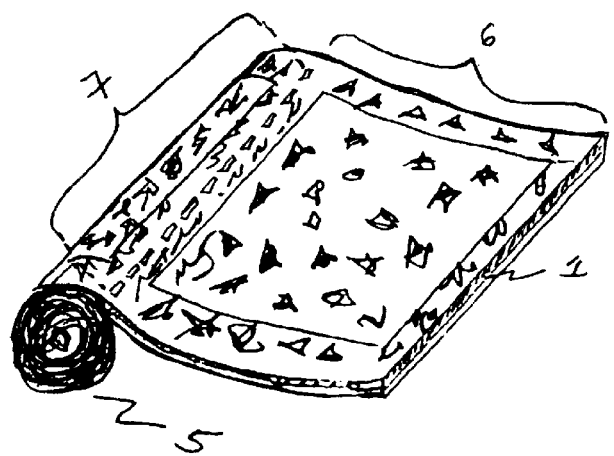
FIG. 3 shows a roll of highly embossed dual layered wrapping material of this invention with specialized perforations thereon.

FIG. 3 is a roll 5 of laminated material made according to the teachings of this invention. In this figure, a portion of the length of this roll is shown as 6 and a series of perforations or slits 7 across the width of the roll in the form of a line of small slits cut through the dual layered element 1 that will result in a sheet of material when separated from the roll 5 along these perforations 7.

Figure 4:
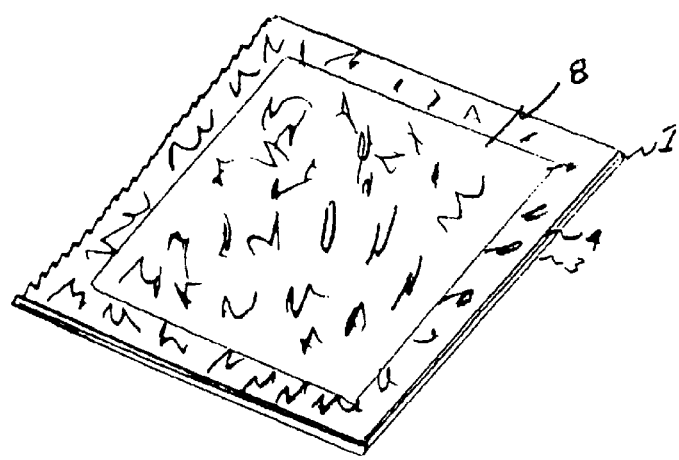
FIG. 4 is a sheet of dual layered wrapping material separated from the roll of FIG. 3.

FIG. 4 is a sheet of material 1 separated from either roll 5 with the dual layers 3 and 4 clearly seen. Layer 3 has the requisite embossment shown as 8. It is this embossment that yields a dimensional image graphically shown as lines and angles thereon. The various colors and intensity of colors are a result of the combination of depths and angles of the heavy mechanical embossing.

FIGS. 5–8 demonstrate some of the ways of wrapping floral elements using the sheets taken from this invention. FIG. 5, for example, shows an individual sheet 9 formed up and around a flower pot, wherein the flowers are shown as 10. A highly embossed image in the design of flowers (one of which is shown as 11) has been imparted on this particular sheet of material to serve in a decorative manner. A band 12 is shown up near the top of the flower pot (shown in dashed lines 13) that may alternatively serve to hold the sheet of wrapping material around the pot.

FIG. 6 shows the sheet of dual layered wrapping material 1 ready to wrap a bundle of flowers the stems of which are shown as 14 and the flowers as 15. In this view, the highly embossed sealing layer is not seen. The forming layer is shown ready to wrap around the stems 14 of this flower arrangement.

Figure 7:
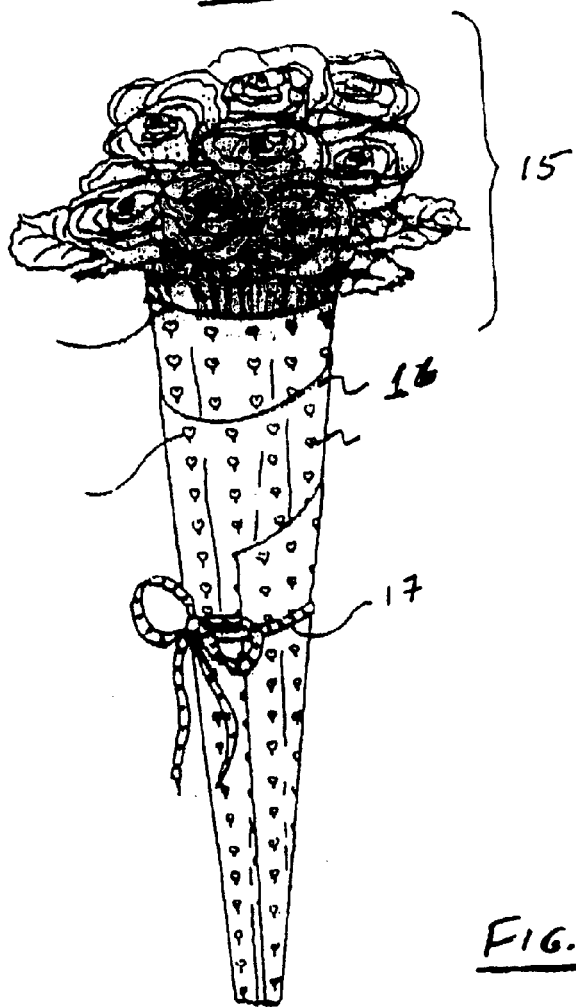

FIG. 7 shows the floral arrangement of FIG. 6 already wrapped up. In this figure, 1 is again the sheet of wrapping material from this invention with the highly embossed sealing layer on the outside of the wrapped floral arrangement, the flowers of which are shown as 15. One of the decorative highly embossed images on this sealing layer is shown as 16 in the form of a heart. A decorative ribbon 17 may also be added as shown in this figure.

Figure 8:
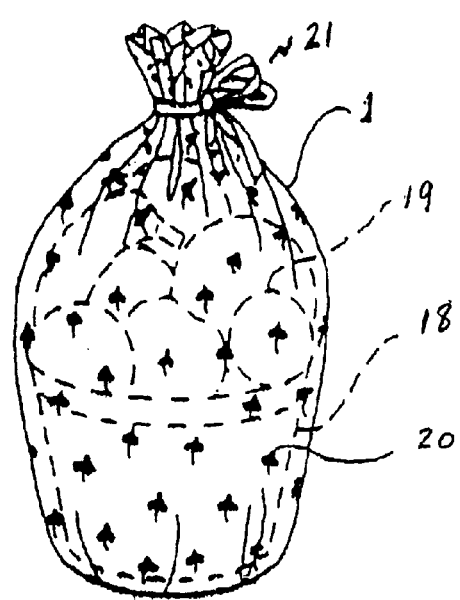

FIG. 8 shows a basket 18 containing some fruit 19 wrapped in the wrapping material 1 of my invention. A series of highly embossed, images, one of which is shown as a clover element 20 is shown on the sealing layer which forms the outside of the wrapping material. A ribbon 21 may also be included as shown.

The sealing layer of this invention is made from a plastic composition such a those including:

polyesters such as polyethylene terephthalate;

low and high density polyethylenes;

polypropylenes including those that are biaxially and monoaxially oriented and cast materials;

materials made from ethylenepropylene random copolymers;

polybutylenes;

polymethylpentenes;

materials know commonly as "nylons";

cast acrylates;

cellulosic materials such as cellulose acetate;

polycarbonates;

polystyrenes;

polyurethanes;

cellophane;

polyimides;

styrene butadienes; among others.

These materials, which are some of the more common materials known as "plastics", are usually fairly thin with a thickness of between 0.25 mils and 25 mils or so. These materials can be used to stop the flow of liquids such as water which may be present within the items wrapped therein and to prevent leakage therefrom. These sealing layers are highly embossed in a manner to impart a pleasing image thereon. Alternatively, these sealing layers may be laminated first to the forming layer and subsequently embossed. This particular process will emboss an image deep down into the sealing layer and even penetrate into the forming layer as well, making an image that is doubly difficult to perforate and form sheets from a roll made according to this particular embodiment.

This high embossing process can be imparted in depths from 0.25 to 5.0 microns and this particular step alters the refractivity of the primary colors of the light spectrum. The individual colors (red, yellow, green and blue) that emanate from this embossed surface are not as pronounced yielding a more 2-dimensional look as opposed to a 3-dimensional look for holographic embossing.

The forming layer which is part of the dual layer embossed holographic image sheet of this invention is normally an aluminum layer. This aluminum layer may also have a thickness of between 0.25 mils to 25 mils so that the combined dual layered element is between 0.50 to 50 mils in thickness. Aluminum will form easily when crushed or wrapped around an object.

The sealing and forming layers are laminated, glued or put together using a combination of lamination and glue. Thus, in a preferred embodiment of this particular invention, a layer of low melt (180°) polypropylene heat seal coating (0.08 to 8 mils thick)—the sealing layer—is highly embossed using a conventional embossing roller as described above. There are two sides to this sealing layer, one side having been highly embossed enhanced with the desired pattern. The second side which is a higher melt (280°) poly-pro™ core, is then coated with an adhesive. The coating weight of this treated sealing layer thus may be in the range of 0.25 to 1 mil in thickness. The side of the core layer coated with the adhesive is then laminated under heat and pressure to an aluminum foil of 0.00025 to 0.0020 inches in thickness—the forming layer—and the result is the wrapping element 1 shown in the drawings attached hereto. A roll of material may be formed by automatically rolling up a length of this material as it exits the lamination process and this is shown in FIGS. 3 and 4.

If the alternative embodiment process employing a lamination of the sealing layer first to the forming layer followed by a deep embossment thereof, it is possible to eliminate the more costly step of applying the above referenced heat sealing layer.

My unusual, highly embossed dual layered wrapping material is eminently useful within the floral industry for the wrapping of floral arrangements, flower pots and the like. Usually, a sheet of 20 inches by 16 to 20 inches is a conventional size for this process. However, a roll of my material, which may be from 16 to 30 inches in width, is extremely tough and durable and difficult to cut easily into the desired sizes. It has been proposed to sell the product already chopped commercially into these sizes. The machine to cut these materials is costly and thus the cost of the material has to be passed on to the using industry. Additionally, it is difficult to store individual sheets of material without them becoming wrinkled or otherwise deformed. Another way is to furnish the industry with rolls of the material and let them slice off the desired length. This is difficult to do since the materials of construction are so tough and durable. Also, this adds cost to the using industry since labor must be expanded to cut the material into sheets for use. Finally, the toughness of this material sometimes results in ragged and off center cuts. It is suggested that the very fact of imparting a highly embossed image on the surface of the sealing layer and the lamination under heat and pressure, adds considerable strength to the material made therefrom and thus make it difficult to cut or tear off. Additionally, this deeper embossing creates a severe problem with the perforating process in that the distance between each perforation has to be minimized in order to prevent premature side tearing. The direction of this perforating tear can easily be altered due to the depth of the embossing design. The mechanical imprint from the embossing cylinder will create a so-called "tear path" which will deviate from the intended perforation path. This will result in a failed sheet of the desired shape (square, rectangular, etc.). Thus, there is this pressing need to perforate this material along the length of the roll so that individual sheets can be separated therefrom as needed.

Perforations are imparted transversely across the roll at designated positions along the length thereof. These perforations may be in the form of small slits (see FIG. 3) punched through the dual layered embossed material of this invention. These perforations represent weakened points so that when one pulls down from the end of the roll, a sheet of material of the desired size will be torn therefrom. These weakened points or perforations should penetrate through the thickness of the material and can vary in number of between 1 to about 80 perforations per inch. The material left between each slit can vary from about 0.50 inch to about 0.01 inch It is imperative that the perforations or slits penetrate the entire thickness of the material of this invention in order to function properly. Dual layered materials made from plastic and aluminum are very tough but the material of this invention is even more durable and tough and it is theorized that the very act of imparting a highly embossed image thereon during a heating step may increase the durability of the plastic sealing layer by changing the physical characteristics thereof. Also, these deep embossments tend to interfere with the perforation step and the slitting elements used therewith. Even the act of perforating this material is difficult and must be done in a careful manner. It has been noted that when perforated the material forms micro and minute strips of material along the perforation lines. If not perforated enough, the sheets will not pull or tear off and if perforated too much it will tear off prematurely during the rewinding process.

The aluminum foil forming layer of this invention may be any of the conventional materials well-know within the art. Most of these prior art materials are sold commercially in a number of different widths, lengths and thicknesses. I prefer using foil of about 20 inches in width and thicknesses of about 0.002 inches to 0.00025 inches with a thickness of about 0.00065 inches being somewhat preferred. The polymeric sealing layer is generally made from polypropylenes or polyethylenes. As mentioned previously, the plastic or polymeric layer is embossed on one side. This process involves applying an image master to the surface under heat and/or pressure using a roller that forms an embossed image thereon. It has been speculated that this additional step changes the polymeric characteristics of the plastic film layer and thus increased the durability and toughness thereof. An adhesive is then applied to the other side and then the two layers are laminated together to form the element of this invention. Any variety of highly embossed images may be placed thereon to improve the visual characteristics of this product. Coloring materials may be added to the composition of the plastic layer also to enhance the product.

In the embodiment involving a process of laminating the sealing layer to the forming layer first and then applying deep embossment thereof, all of the aforementioned steps mentioned above also apply.

Commercially, lengths of this dual layered material, perforated across the width and at any desired positions defining specific length of sheets, may be made. Rolled up in desired lengths this material can be used by the floral industry easily and handily. The rolls may be hung up near the user and each sheet just pulled therefrom. The need for sharp knives or scissors and the time it would take to cut the desired length of sheets is thus eliminated.

I have now described an additional useful element made from a dual layered highly embossed element. Since this product is durable and hard, it was surprising that it could be perforated and still find good use within the floral wrapping industry.

I claim:

1. A process for the preparation of sheets of a dual layered wrapping element from a roll, said roll comprising a length described by a starting end and a finishing end, and two sides, said sides describing a width thereof, and wherein said layers describe a thickness thereof, said process comprising the steps of:
   a. laminating a plastic sealing layer to a forming layer;
   b. imparting a highly embossed non-holographic image on said sealing;
   c. inscribing a multitude of rows of perforated slits across the width of said roll wherein said slits perforate the entire thickness of said element and are formed from about 1 to about 80 perforations per inch, said rows of perforations set at predetermined points along the length thereof; so that when force is applied at said perforations sheets of said dual layered highly embossed element will be separated from said roll.

2. The process of claim 1 wherein said plastic sealing layer is taken from the group comprising:

a polyethylene terephthalate;

low and high density polyethylenes;

polypropylenes including those that are biaxially and monoaxially oriented and cast materials;

materials made from ethylene-propylene random copolymers, polybutylenes;

polymethylpentenes;

a nylon cast acrylates;

cellulosic materials such as cellulose acetate;

polycarbonates;

polystyrenes;

polyurethanes;

cellophane;

polyimides;

and, styrene butadienes and said forming layer is aluminum foil.

3. The process of claim 1 wherein said width of said roll is between 16 to 30 inches.

4. The process of claim 1 wherein said width of said roll is 20 inches and said rows of are placed at a distance of 20 inches apart along the length of said roll.

5. The process of claim 1 wherein the depth of said embossment is from 0.25 to 5.0 microns.

6. The process of claim 1 wherein said image is colored.

* * * * *